United States Patent [19]

Allemeersch et al.

[11] 4,218,864
[45] Aug. 26, 1980

[54] DRIVE REVERSING MECHANISM

[75] Inventors: Jozef R. G. Allemeersch, Jabbeke; Thierry E. G. Devriese, Brugge, both of Belgium

[73] Assignee: Sperry Corporation, New Holland, Pa.

[21] Appl. No.: 54,196

[22] Filed: Jul. 2, 1979

[30] Foreign Application Priority Data

Jul. 3, 1978 [GB] United Kingdom ............... 28590/78

[51] Int. Cl.³ ............................................ A01D 69/00
[52] U.S. Cl. ........................................ 56/11.2; 56/11.8
[58] Field of Search .................... 56/11.2, 11.8, 11.7, 56/10.8

[56] References Cited

U.S. PATENT DOCUMENTS

| | | | |
|---|---|---|---|
| 2,076,056 | 4/1937 | Woodford | 56/11.2 |
| 3,599,407 | 8/1971 | Bichel | 56/11.8 |
| 3,948,024 | 4/1976 | Allen et al. | 56/11.2 |
| 4,126,987 | 11/1978 | Sarich | 56/217 |
| 4,138,837 | 2/1979 | Love | 56/11.2 |

Primary Examiner—Paul J. Hirsch
Attorney, Agent, or Firm—Frank A. Seemar; Ralph D'Alessandro; Larry W. Miller

[57] ABSTRACT

A harvesting machine comprising drive means for driving certain components thereof, drive control means for engaging and disengaging the drive means, drive reversing means associated with the drive means, and control means for controlling the drive reversing means and being actuable in unison with the drive control means, the arrangement being such that upon actuation of the drive control means and the reversing control means in unison, first the drive reversing means are actuated and subsequently the drive means are engaged so as to be driven in the reverse direction.

5 Claims, 6 Drawing Figures

DRIVE REVERSING MECHANISM

BACKGROUND OF THE INVENTION

1. Field of the Invention

The present invention relates to drive reversing mechanisms for harvesting machines such as combine harvesters. More particularly the invention relates to mechanisms for reversing the drive of a component of such machines for removing a lump of crop material which has caused a blockage in the machine.

2. Description of the Prior Art

It occasionally happens in combine harvesters that the threshing cylinder or the straw elevator becomes blocked by an excess of crop material being fed between the threshing cylinder and the threshing concave, and between the straw elevator chain and the elevator floor, respectively. Much more frequently, the header auger becomes blocked by an excessively large lump of crop material which wedges between the auger flights and the header floor. In all these circumstances either a safety clutch or drive belts start to slip. Clearing a blockage in the threshing means normally can be accomplished merely by lowering the threshing concave and re-engaging the drive, whereby the lump of material will pass through the enlarged gap between the threshing cylinder and threshing concave. Clearing a blockage in the straw elevator is much more difficult and time consuming. Access doors must be opened and the lump must be pulled out manually. Avoiding such blockages obviously would be much more desirable. It is possible to set the safety clutches in the drives of the elevator and the header so that if an excessively large lump of crop material is present, normally a blockage of the header auger will occur rather than of the elevator. Practice indicates that about 95-98% of elevator blockages can be avoided in this way.

However, clearing a blockage of the header auger also must be accomplished manually in most conventional machines. This is also very time consuming, dirty and sometimes difficult. It is indeed sometimes difficult as the blocking lump of material may be held very tightly between the auger and the header floor so that it can be removed only piece by piece. However, time is extremely valuable especially during the short harvesting period and therefore long interruptions in operation such as caused by the clearing of a blocked machine cannot be tolerated. Moreover, clearing a header blockage is a dangerous exercise as the operator normally has to reach the header auger from between the reel and the cutterbar so that he may contact either the reel tines and/or the sharp edges and points of the cutterbar and be injured thereby.

Similar problems of blockages and clearing the same are known also in connection with other agricultural harvesting machines, such as forage harvesters.

In an attempt to overcome the foregoing problems it is common practice on forage harvesters to provide a reversible gearbox in the drive of the feed rolls thereof and of the pick-up attachment. A reversible gearbox in the header drive of a combine harvester is also known as evidenced by the disclosure of Belgian Pat. No. 860.077. However, such reversible gearboxes are relatively expensive as they involve a large number of gears. This extra expense is difficult to justify having regard to the number of times and duration of usage of the reverse drive.

In another prior art arrangement, means have been proposed for driving the threshing cylinder in reverse when the latter is blocked. To this end the threshing cylinder is drivingly coupled by special drive means to one of the traction wheels of the combine and the combine is moved rearwardly to effect the clearing of a blockage. Thus as the combine is driven rearwardly, the blocking lump of material is removed in a forward direction. This is a complicated and expensive approach to the problem and has not proved to be a practicable proposition. Furthermore, the lump of material cleared from the threshing means in this manner can merely be fed back to the elevator so that it again causes a blockage when the combine is driven forward. Such an arrangement shown in German UM No. 69.13.630.

In another arrangement a double declutching device for a combine harvester has been proposed for declutching the traction drive for the forward movement of the machine and the drive to the header simultaneously, or shortly one after the other, with only one control. This is done as soon as a crop feeding problem, for example in the header, is noticed. However in practice it appears that quite often such a feeding problem is noticed too late and that a blockage occurs before the operator has had a chance to intervene. Thus this arrangement is not entirely satisfactory and is of no use once a blockage has occurred as it does not effect any clearance of a blockage. Such an arrangement is shown in German Pat. No. 1,655,576.

SUMMARY OF THE INVENTION

The object of the present invention is to reduce or to eliminate one or more of the above discussed disadvantages of known machines.

According to the present invention, a harvesting machine comprises drive means for driving certain components thereof, drive control means for engaging and disengaging the drive means, drive reversing means associated with the drive means, and control means for controlling the drive reversing means and being actuable in unison with the drive control means, the arrangement being such that upon actuation of the drive control means and the reversing control means in unison, first the drive reversing means are actuated and subsequently the drive means are engaged so as to be driven in the reverse direction.

The invention is particularly useful on a combine harvester comprising a header. The header may be of the grain type comprising a cutter bar, a reel and a header auger. The drive means are arranged to drive the header components and preferably comprise a belt drive transmission. The drive control means preferably are formed by a pivotably mounted pulley which is adapted to tension the drive belt in the belt drive transmission and thus engage the drive. The pulley may be pivoted towards and away from the drive belt by a handle pivotably mounted on the operator's deck or platform. The drive means may further comprise shaft means which, for the purpose of reversing the drive direction, comprise an input shaft and an output shaft. An intermediate shaft may be provided parallel to the shaft means and drivingly coupled via a first chain and sprocket transmission to the output shaft. A second chain and sprocket transmission may be provided between the input shaft and the intermediate shaft, the arrangement being such that the intermediate shaft may be driven by the input shaft in a direction opposite to the direction of the rotation of the latter. The reversing means may further comprise a coupling sleeve shiftable between two coupling positions. In the first position, the input shaft is coupled directly to the output shaft so that the latter may be driven in the same direction as the former. In this position the second chain and sprocket transmission between the input shaft and intermediate shaft is drivingly disengaged. In the other position of the coupling sleeve, the chain and sprocket transmission between the input shaft and the intermediate shaft is drivingly engaged and the intermediate shaft, and hence also the output shaft, are driven in a direction opposite to the direction of rotation of the input shaft.

The control means for controlling the drive reversing means may be coupled to the coupling sleeve and comprise a cable transmission extending from the reversing mechanism to a control lever in the vicinity of the aforementioned handle on the operator's deck. The cable transmission preferably comprises first spring means operable to urge the coupling sleeve into its first coupling position, and second spring means with a spring rate exceeding the spring rate of the first spring means, whereby the second spring means will in effect start stretching only when the first spring is fully loaded and the coupling sleeve is shifted completely into its second coupling position. The control lever may be connectible either to the header drive engaging handle or may have an independent handle. In the latter case, the arrangement is such that when this control handle is actuated, the header drive engaging handle is actuated in unison therewith; albeit with a predetermined delay. In both cases, either actuation of the header drive engaging handle when the control lever is connected thereto, or actuation of the control handle, results in first the drive direction being reversed and subsequently the drive being engaged in the reverse direction.

BRIEF DESCRIPTION OF THE DRAWINGS

A combine harvester embodying the present invention will now be described in greater detail, by way of example, with reference to the accompanying drawings in which.

DETAILED DESCRIPTION OF THE DRAWINGS

Figure 1:
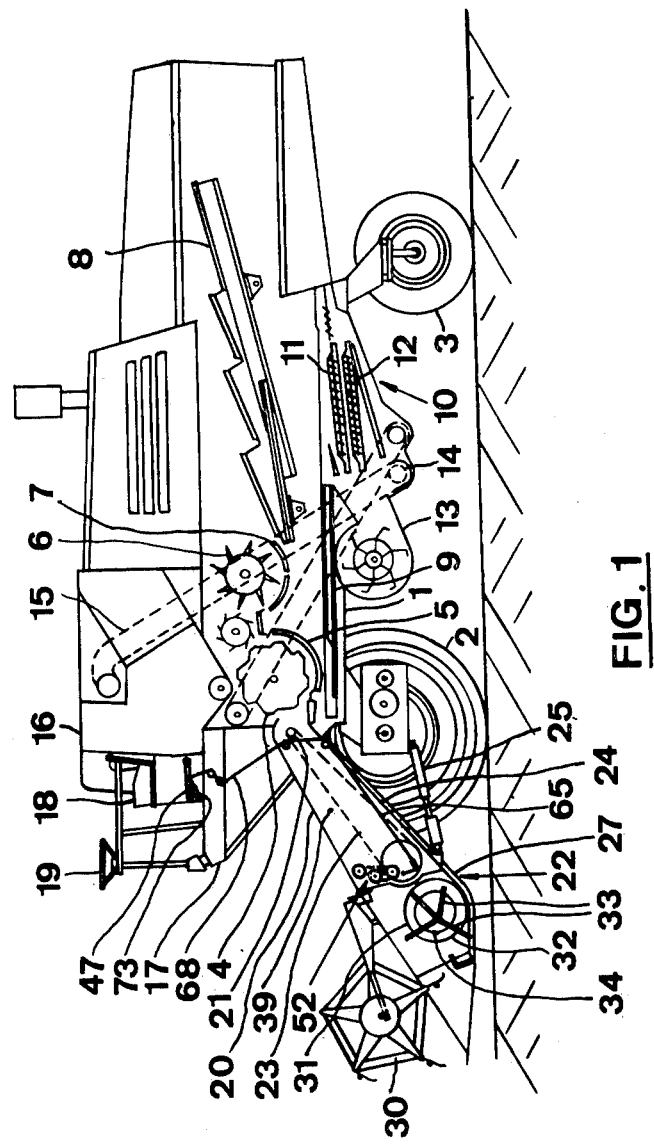
FIG. 1 is a schematic side view of the combine harvester.

With reference to FIGS. 1 to 4, a combine harvester is shown comprising a main chassis 1 supported on a pair of front traction wheels 2, and a pair of rear steerable wheels 3. A threshing cylinder 4 is arranged for cooperation with a threshing concave 5 to thresh crop fed therebetween and to separate grain from straw. Threshed straw is supplied to a rotary separator 6 which is cooperable with a separator concave 7 and then fed to straw walkers 8 for further grain separation in a conventional manner. The straw leaving the straw walkers 8 is discharged onto the ground. Grain separated through the threshing concave 5, the separator concave 7 and the straw walkers 8 is collected on a reciprocating grain pan 9 and fed thereby to grain cleaning means generally indicated at 10. The cleaning means 10 comprise reciprocable cleaning sieves 11 and 12 and a cleaning fan 13 directing a cleaning air blast from below through the cleaning sieves 11 and 12. Chaff and other discardable material is blown out of the machine whilst the clean grain is collected by a clean grain auger 14 and fed via a grain elevator 15 to a grain tank 16 for temporary storage therein.

An operator's deck or platform 17 with an operator's seat 18 and a steering wheel 19 is provided forwardly of the grain tank 16 and generally above a crop material elevator 20. The elevator 20 is pivotally mounted at 21 on the chassis 1 and supports at its forward end a header which is generally indicated at 22. The elevator 20 comprises an elevator chain 23 which is driven so as to convey crop material received from the header upwardly over a bottom wall 24 of the elevator and towards the threshing cylinder 4 and concave 5. The header and straw elevator are adjustable in height by means of hydraulic cylinders 25 extending between the chassis 1 and the elevator 20.

The header 22 comprises a header frame or trough 27 extending transversely of the machine and extending the full width of the straw elevator 20 and the chassis 1. A reciprocating cutterbar 28 (FIG. 2) is provided at the forward edge of a header bottom wall 29. A reel 30 is positioned generally above the cutterbar 28 for accomplishing one or more of the following functions: lifting fallen crop forwardly of the cutterbar 28, holding standing crop in position while it is being cut by the cutterbar 28, and feeding cut crop rearwardly over the cutterbar 28 towards a header auger generally indicated at 31. The header auger is positioned rearwardly of the cutterbar 28 and in the header trough 27 at a short distance above the bottom wall 29 thereof. The header auger 31 comprises outer sections with opposite auger flights 32 thereon for conveying cut crop to the centre of the header at which a section with retractable fingers 33 mounted in a tube 34 is located, the fingers 33 being operable in their extended position to grip crop material and to pull it underneath the auger tube 34 in a rearward direction and to release it, by finger retraction, at an infeed opening of the straw elevator 20 and to transfer it to the elevator chain 23.

All components described and listed above are driven in the conventional manner and therefore the drive means will not be described in any detail, except for those which are related to the present invention.

The header 22 and elevator 20 are arranged so that the former can easily and quickly be detached from the latter and placed on a trailer for transport purposes as is conventional. The drive means from the power source (not shown) mounted on the main chassis 1 to the header 22 are also arranged for easy and quick interruption when the header is to be detached from the straw elevator. This is accomplished by providing intermediate shaft means 35 comprising a first section 36 and a second section 37 drivingly connectible to each other by clutch means 38. The first section 36 is rotatably supported on a left-hand side wall 39 of the straw elevator 20 and the second section 37 is rotatably mounted on the back of the header trough 27, the arrangement being such that when the header 22 is in the operative position on the straw elevator 20, both sections 36, 37 are axially aligned with each other. The clutch means 38 comprise a square section 40 keyed to the first shaft section 36 and a corresponding hollow, and slidably mounted, section 41 on the second shaft section 37. The hollow clutch section 41 can be slid over the square clutch section 40 to drivingly engage the shaft 37 with the shaft 36.

Motive power is supplied from the power source to the header 22 via a number of transmissions (shown only partially) comprising amongst others a first belt 42 which extends around a pulley 43 which is coaxial with the pivot axis 21 of the elevator. A drive engaging tension pulley 44 is rotatably mounted on a pivot arm 45 pivotally supported on the chassis 1 on a pivot 46. The tension pulley 44 may be pivoted towards and away from the belt 42 by a handle 47 on the operator's deck 17 connected to the arm by linkage means 48 shown only schematically in FIG. 2. The handle 47 is movable between a lowermost (drive disengaged) position as shown in full lines in FIG. 2 and a raised, generally upright (drive) position as shown in broken lines in FIG. 2. The handle 47 is held in this upright position by overcentre means (not shown).

A further drive belt 49 extends generally parallel to the elevator side wall 39 and between a pulley 50 drivingly coupled to the aforementioned pulley 43 on the one hand and a further pulley 51 keyed on the first shaft section 36 of the intermediate shaft means 35 on the other hand.

The reversing means, generally indicated at 52, are coupled to the second shaft section 37 and will be described in more detail hereinafter. The header drive means are conventional from thereon and will not be described in any detail. It is sufficient to state here that these further drive means may comprise a belt variator, chain drive transmissions and reciprocating drive means to drive respectively the reel 30, the header auger 31 and the cutter bar 28. Conventionally, the header auger drive also comprises a safety clutch in the form of a ratchet or friction clutch which can be set at a predetermined operating torque.

Figure 2:
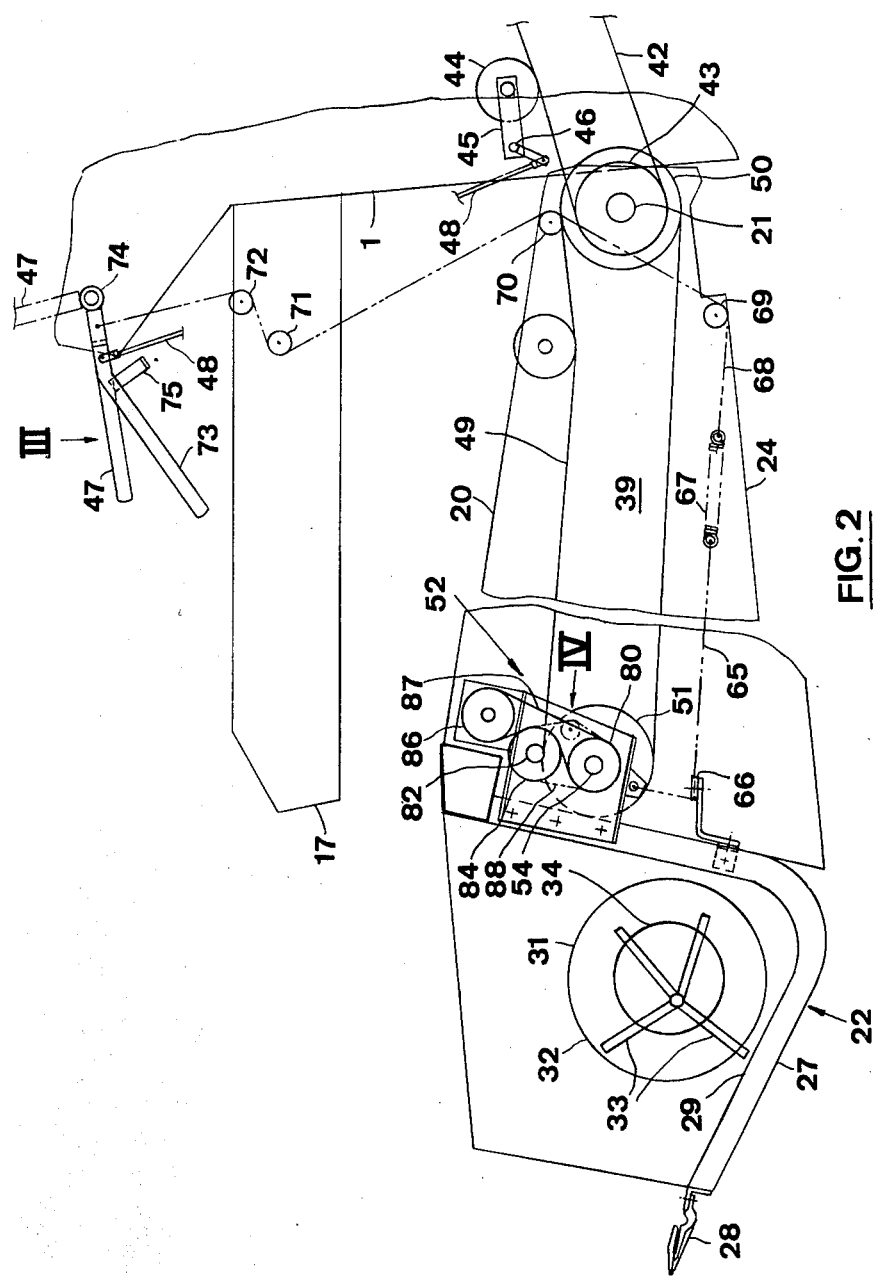
FIG. 2 is a view similar to FIG. 1 but on a larger scale and only showing certain portions of the machine and with the elevator in the raised position.
Figure 3:
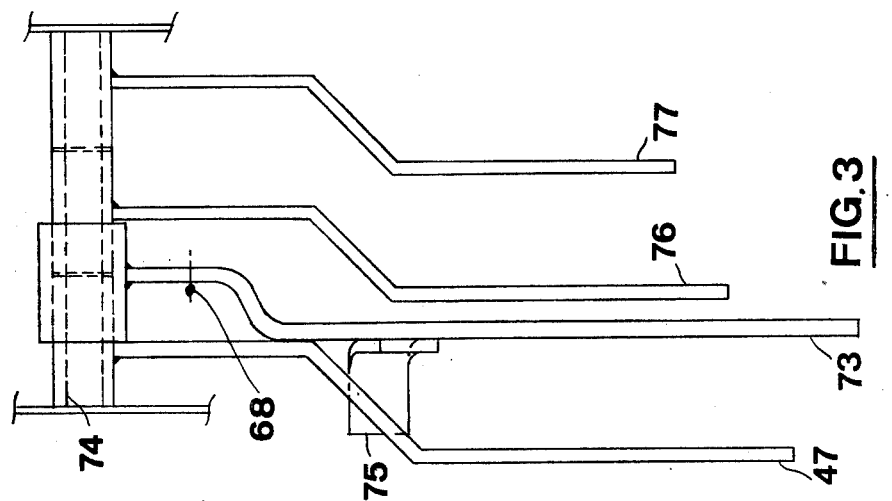
FIG. 3 is a detail view taken in the direction of arrow III in FIG. 2.
Figure 4:
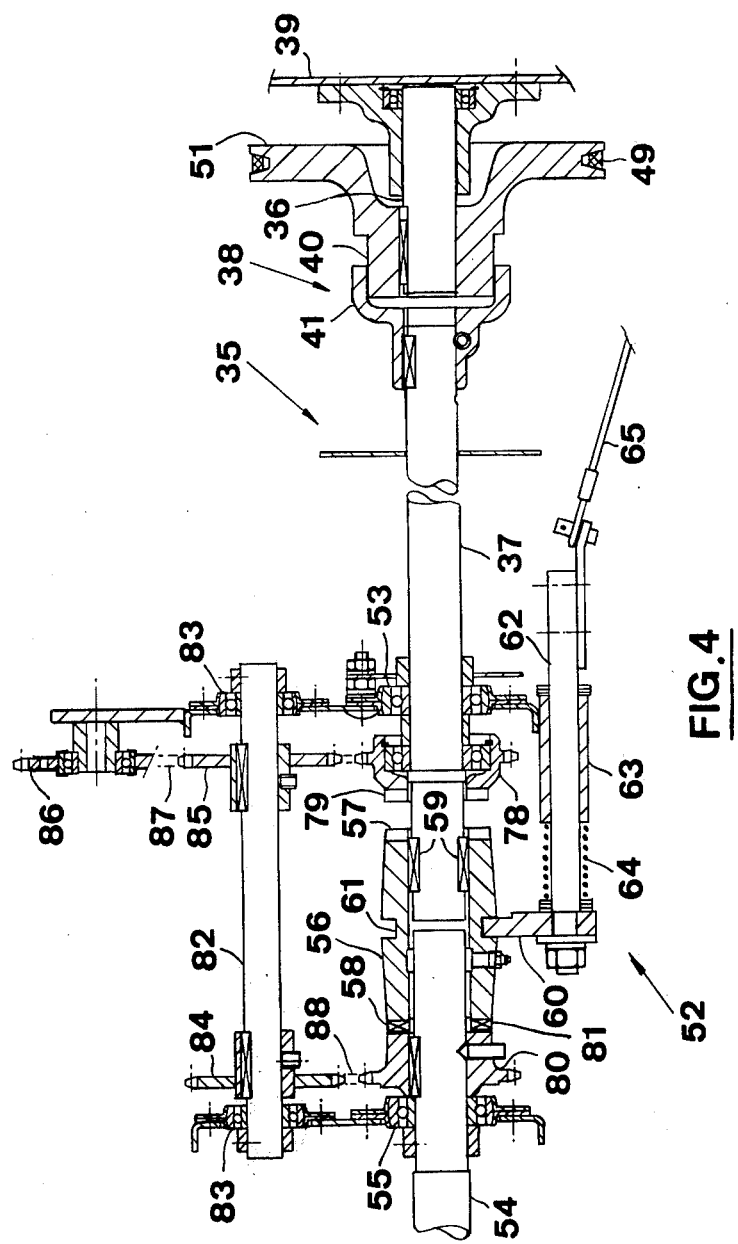
FIG. 4 is a detail view taken in the direction of arrow IV in FIG. 2.

The reversing means 52 will now be described in greater detail. The second shaft section 37 is supported in bearings 53 and is aligned at its end opposite to the first shaft section 36 with an output shaft 54 which is rotatably supported on the back of the header trough 27 by bearings 55. A coupling sleeve 56 with coupling teeth 57, 58 at respective ends is slidably mounted over the facing ends of the output shaft 54 and the second shaft section 37 and is drivingly coupled to the latter via keys 59. A control fork 60 is cooperable at its forked end with an annular recess 61 in the coupling sleeve 56 and is attached at its opposite end to a control rod 62 which is slidably supported in a bush 63 which itself is supported on the back of the header trough 27. A compression spring 64 is arranged between the control fork 60 and the bush 63 and is arranged to urge the control fork 60 and the sleeve 56 towards the left as seen in FIG. 4. A pull cable 65 is coupled to the end of the rod 62 opposite to the end thereof supporting the fork 60. The coupling between the cable 65 and the rod 62 is of a type allowing an easy and quick disconnection when the header 22 is detached from the straw elevator 20. The cable 65 extends around a roller 66 supported on the elevator side wall 39 and extends therefrom upwardly and rearwardly alongside the elevator side wall. The cable 65 is further coupled to one end of a tension spring 67 the other end of which is connected to a further pull cable 68 (FIG. 2). This further pull cable 68 extends around a first pair of rollers 69, 70 adjacent the elevator pivot axis 21 and a further pair of rollers 71, 72 on the operator's deck 17. The cable 68 is further connected to a handle 73 which, like the handle 47, is pivotally mounted on a pivot shaft 74. The handle is cranked and in the drive-disengaged position is located substantially below the level of the handle 47 as seen in FIG. 2. The handle 73 supports an abutment 75 which is arranged to contact the handle 47 with a predetermined delay when the former is moved from the drive-disengaged to the drive position. Further handles 76 and 77 (FIG. 3) are pivotally mounted on the same pivot shaft 74 for controlling other functions of the machine.

A sprocket 78 is freely rotatably mounted on the second shaft section 37 of the intermediate shaft means 35 and is provided with an additional set of teeth 79 arranged for cooperation with the teeth 57 on the coupling sleeve 56. The output shaft 54 supports a similar sprocket 80 which comprises an additional set of teeth 81 for cooperation with the teeth 58 of the coupling sleeve 56. This sprocket 80 however is keyed on the output shaft 54 rather than being freely rotatable thereon. An intermediate shaft 82 is rotatably mounted on the back of the header trough 27 via a pair of bearings 83 and extends parallel to the shaft means 35. First and second sprockets 84 and 85, respectively, are keyed on the intermediate shaft 82 in respective alignment with the aforementioned sprockets 78 and 80. A further sprocket 86 is rotatably mounted on the back of the header trough 27 in alignment with the sprockets 78 and 84. A first chain 87 extends around the sprockets 78, 85 and 86 in a manner such that when driven, the shafts 37 and 82 are rotated in opposite directions. A further chain 88 extends around the sprockets 80 and 84 for the shafts 54 and 82 to be rotated in the same direction thereby. In the normal position, the sleeve 56 is resiliently urged into engagement with the sprocket 80 whereby motive power is transferred directly from the second shaft section 37 to the output shaft 54 whilst the intermediate shaft 82 is rotated therewith in the same direction, via the chain 88. No power is transmitted by the intermediate shaft 82.

When the coupling sleeve 56 is shifted against the force of the spring 64 (on actuation of the handle 73), and into engagement with the sprocket 78, motive power is transferred from the second shaft section 37 to the outer shaft 54 via the intermediate shaft 82, thus reversing the direction of rotation of the output shaft 54.

OPERATION

In operation, the machine is driven in a field of standing crop with the header in its lowered, operative position and with all components being driven. More particularly, the header drive is engaged by positioning the handle 47 in its raised position. The handle 73 remains in its lowered position, which means that the compression spring 64 resiliently urges the coupling sleeve 56 into engagement with the sprocket 80, thus driving all header components in the normal operative direction. The rollers 69, 70 and 71, 72 are positioned so that pivoting of the header 22 and the elevator 20 around the pivot axis 21 will not influence the position of the coupling sleeve 56. The safety clutch setting of the header auger drive is such that this clutch will start slipping at a predetermined excessive load: the arrangement is such that everything fed beyond the header auger 31 without blocking the latter will normally not block other components such as the straw elevator 20 and/or the threshing cylinder 4.

If the header auger 31 becomes overloaded, the safety clutch thereon will slip so as to interrupt the header drive. Such an overload may be caused by various reasons. For example, an excessively large lump of crop material may be fed to, or have accumulated in, the header auger 31. However, a large solid object occasionally may be the cause of the problem. In all cases the blockage occurs at the wedge between the header auger 31 and the header bottom wall 29.

As soon as the safety clutch starts slipping, the operator stops the forward drive of the machine and specifically interrupts the header drive by throwing the handle 47 to the lower position of FIG. 2. All the operator has to do at this point to clear the obstruction, i.e. expell the offending article in a forward direction from the header, is to pull the handle 74 in an upward direction. This movement first pulls the cables 68 and 65 so as to shift the coupling sleeve 56 to the right as seen in FIG. 4 so as to disengage the sprocket 80 and engage the sprocket 78 and thus reverse the drive direction of the shaft 54. This reversal of the drive direction is thus accomplished whilst all drives and driven components are standing still and not under load. This means that the reversal is a smooth operation. To accomplish this reversal during a first step of the blockage clearance operation, the spring 67 is chosen so that its spring rate exceeds the maximum spring rate of the compression spring 64. Thus when moving the sleeve 56 towards engagement with the sprocket 78 and compressing the spring 64, the tension spring 67 does not change in length.

When the coupling sleeve 56 engages the sprocket 78, a greater resistance to the movement of the handle 73 is experienced and the coil spring 67 starts stretching. Further lifting of the handle 73 now results in the abutment 75 contacting the handle 47 so as to move the latter in unison with the handle 73. Thus the tension pulley 44 is moved towards the drive belt 42 to re-engage the header drive. However, with the drive direction reversed as explained, this results in all header components being driven in a direction opposite to the normal drive direction. Normally the article causing the blockage is thereby thrown forwardly out of the header 22 and away from its wedging position between the auger 31 and the header floor 29. The auger safety clutch will not slip, or at least will not continue to slip, during this clearing operation, as the obstruction is no longer wedged in the header.

The control handle 47 does not assume its normal drive position even though the handle 73 is held in a fully upright position due to the angular offset between the handle 47 and the abutment 75. This also means that the handle 47 has not moved over centre and that as soon as the handle 73 is dropped, the header drive handle 47 will fall back to drive-disengaged position. In this way, first the header drive is automatically interrupted again and subsequently the coupling sleeve 56 is shifted back to its normal drive position by the action of the spring 64. This movement again occurs with the drive components either standing still or at least with the drive components not under load in the event that they are still moving due to inertia.

If a foreign object was the cause of the blockage, then normally this object should be removed manually from the path of the combine after having been ejected from the machine. If, however, the blockage was due to an excessively large lump of crop material, the operation of the machine can start again immediately. The header drive is re-engaged in the normal operative direction by actuation of the handle 47 and the operator has then gradually to tear apart the lump of material as it is re-introduced into the combine. This is accomplished with the reel 30 as is generally known in the art.

ADVANTAGES

From the foregoing it will be clear that a simple and cheap, and yet a very effective, drive reversing mechanism for reversing the header drive of a combine harvester has been provided with which it is possible quickly and safely to remove blockages in the header. The operator never has to leave the operator's platform for the actual clearance operation and more especially has not to pull out the obstruction manually. The combine harvester is further also protected against the blockage of other components with a relatively high degree of certainty.

The drive reversal itself is a very smooth operation as since the actual shifting into reverse and vice versa is accomplished when the drive and driven components are standing still or at least not under load as explained. In other words, the drive means are not heavily and abruptly loaded during the reversing operation as is often the case with known reversing mechanisms for forage harvesters, for example.

ALTERNATIVES

Whilst a specific embodiment of the invention has been illustrated and described, it will be apparent to those skilled in the art that various alterations and modifications in the construction and arrangement of parts can be made without departing from the scope of the invention.

Figure 5:
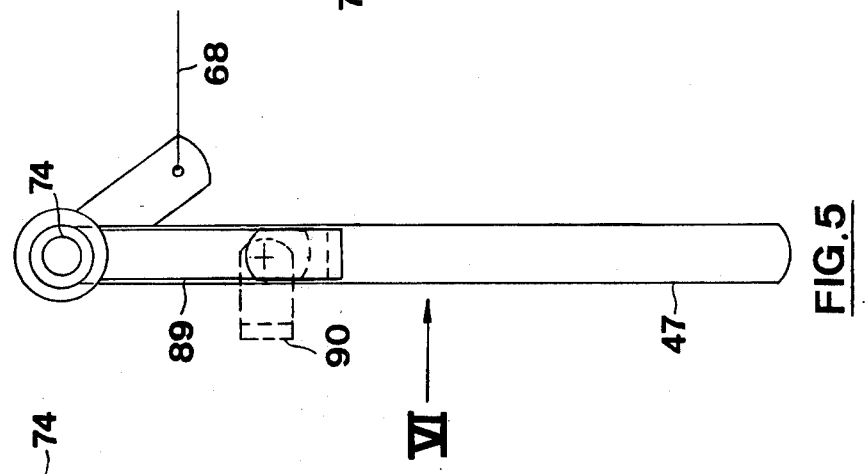
FIG. 5 illustrates an alternative arrangement of certain components shown in FIG. 3.
Figure 6:
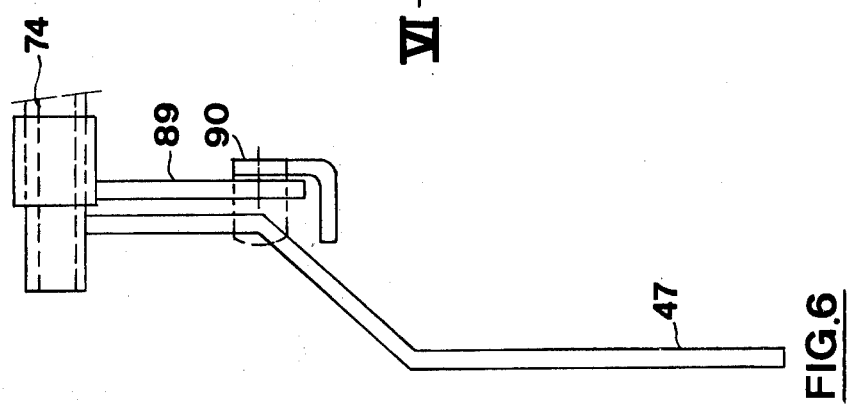
FIG. 6 is a side view of FIG. 5 taken in the direction of arrow VI thereof.

An alternative arrangement is for example shown in FIGS. 5 and 6 wherein the handle 73 has been replaced by a short lever 89 which is pivotally mounted on the pivot shaft 74. The lever 89 supports a pivotally mounted hook 90 at its free end which can be pivoted in a position overlapping the header drive handle 47.

When a blockage occurs, the operator first interrupts the header drive by lowering the handle 47. Subsequently he positions the hook 90 over the handle 47 (by pivoting it to the broken line position of FIG. 6) and lifts the handle 47 again towards the drive position. This movement pivots the lever 89 and pulls on the cable 68 first to reverse the drive direction, in the same manner as described in connection with the embodiment of FIGS. 1 to 4, and then to re-engage the header drive. When lowering the handle 47, the header drive is again disengaged and the normal drive direction reinstated as before. Obviously the transmission ratios of the respective linkages should be such that during the lifting of the handle 47 first the drive direction is reversed and only thereafter the header drive engaged.

With the foregoing alternative arrangement it becomes impossible to activate the reversing mechansim prior to interrupting the header drive. This is an important additional advantage as indeed activating the reversing mechanism prior to stopping the header drive would result in heavy peak loads in various drives with likely attendant damage. This is because when the header auger becomes blocked, the header drive is running at full speed in one direction so that should the reversing mechanism then be actuated, the components would attempt to reverse direction at full speed. Since the lever 89 can only be coupled to the handle 47 when the latter is in its lowered position, this eventuality is obviated.

Having thus described the invention, what we claim is:

1. A harvesting machine comprising drive means for driving certain components thereof, drive control means for engaging and disengaging the drive means, drive reversing means operatively associated with the drive means, control means for controlling the drive reversing means and being actuable in unison with the drive control means, and means for actuating of the drive control means and the reversing control means in unison in order that the drive reversing means is actuated and subsequently the drive means is engaged so as to be driven in the reverse direction.

2. A harvesting machine according to claim 1 and in the form of a combine harvester comprising a header.

3. A harvesting machine according to claim 2, wherein the header is a grain header comprising a cutterbar, a reel and a header auger.

4. A harvesting machine according to claim 3, wherein the drive to the header auger comprises a safety clutch.

5. A harvesting machine according to claim 4, wherein the safety clutch is of the ratchet type.

* * * * *